(12) United States Patent
Montag

(10) Patent No.: US 8,767,820 B2
(45) Date of Patent: Jul. 1, 2014

(54) ADAPTIVE DISPLAY COMPRESSION FOR WIRELESS TRANSMISSION OF RENDERED PIXEL DATA

(75) Inventor: Bruce C. Montag, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 610 days.

(21) Appl. No.: 12/616,716

(22) Filed: Nov. 11, 2009

(65) Prior Publication Data

US 2011/0109792 A1 May 12, 2011

(51) Int. Cl.
*H04N 7/26* (2006.01)

(52) U.S. Cl.
USPC .................................................. 375/240.01

(58) Field of Classification Search
USPC .................................................. 375/240.01
See application file for complete search history.

(56) References Cited

U.S. PATENT DOCUMENTS

| | | | |
|---|---|---|---|
| 5,793,416 | A | 8/1998 | Rostoker et al. |
| 7,024,045 | B2 | 4/2006 | McIntyre |
| 7,072,491 | B2 | 7/2006 | Kondo |
| 7,386,174 | B2 | 6/2008 | Takahashi et al. |
| 7,665,113 | B1 * | 2/2010 | Abrams ........................ 725/94 |
| 2002/0144265 | A1 * | 10/2002 | Connelly ........................ 725/39 |
| 2003/0030720 | A1 * | 2/2003 | Hutchings ................. 348/14.02 |
| 2005/0073964 | A1 * | 4/2005 | Schmidt et al. ............... 370/260 |
| 2005/0100100 | A1 * | 5/2005 | Unger ....................... 375/240.27 |
| 2005/0278733 | A1 * | 12/2005 | Neogi ............................ 725/31 |
| 2005/0289631 | A1 * | 12/2005 | Shoemake ................... 725/118 |
| 2008/0052770 | A1 * | 2/2008 | Ali et al. ........................... 726/9 |
| 2008/0137738 | A1 * | 6/2008 | Fernandes ................ 375/240.03 |
| 2008/0240152 | A1 * | 10/2008 | Quinn et al. ................... 370/466 |
| 2010/0073574 | A1 * | 3/2010 | Nakajima et al. ............. 348/723 |
| 2010/0278271 | A1 * | 11/2010 | MacInnis ................. 375/240.18 |
| 2011/0109792 | A1 * | 5/2011 | Montag ..................... 348/390.1 |

FOREIGN PATENT DOCUMENTS

JP 2009213110 A * 9/2009

OTHER PUBLICATIONS

P 2009213110 A Translation.*
WirelessHD, Newsletter, Nov. 2009 http://www.wirelesshd.org/newsletter/newsletterNOV2009.html.

* cited by examiner

*Primary Examiner* — Mehrdad Dastouri
*Assistant Examiner* — Mohammed Rahaman
(74) *Attorney, Agent, or Firm* — Larson Newman, LLP

(57) ABSTRACT

A system employs adaptive data rate reduction of rendered pixel data for wireless transmission between a source device and a display device. The source device determines the display properties of the display device and the current available bandwidth of a wireless channel connecting the source device to the display device. The source device adjusts a data rate reduction process that is applied to the rendered pixel data before the resulting pixel data is wirelessly transmitted based on these parameters. In response to a change in the data rate reduction process, the source device further can transmit to the display device an indicator that identifies the current data rate reduction type and effective compression ratio being applied by the source device. The display device can use this indicator to configure the processing of the rendered pixel data at the display device so as to mirror or otherwise comply with the particular data rate reduction process applied by the source device.

20 Claims, 3 Drawing Sheets

ADAPTIVE DISPLAY COMPRESSION FOR WIRELESS TRANSMISSION OF RENDERED PIXEL DATA

FIELD OF THE DISCLOSURE

This disclosure relates generally to information handling systems, and more particularly to wireless transmission of display information between information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. One area of focus is the development of components that facilitate the wireless transmission of information between information handling systems, and particularly the wireless transmission of display data between information handling systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
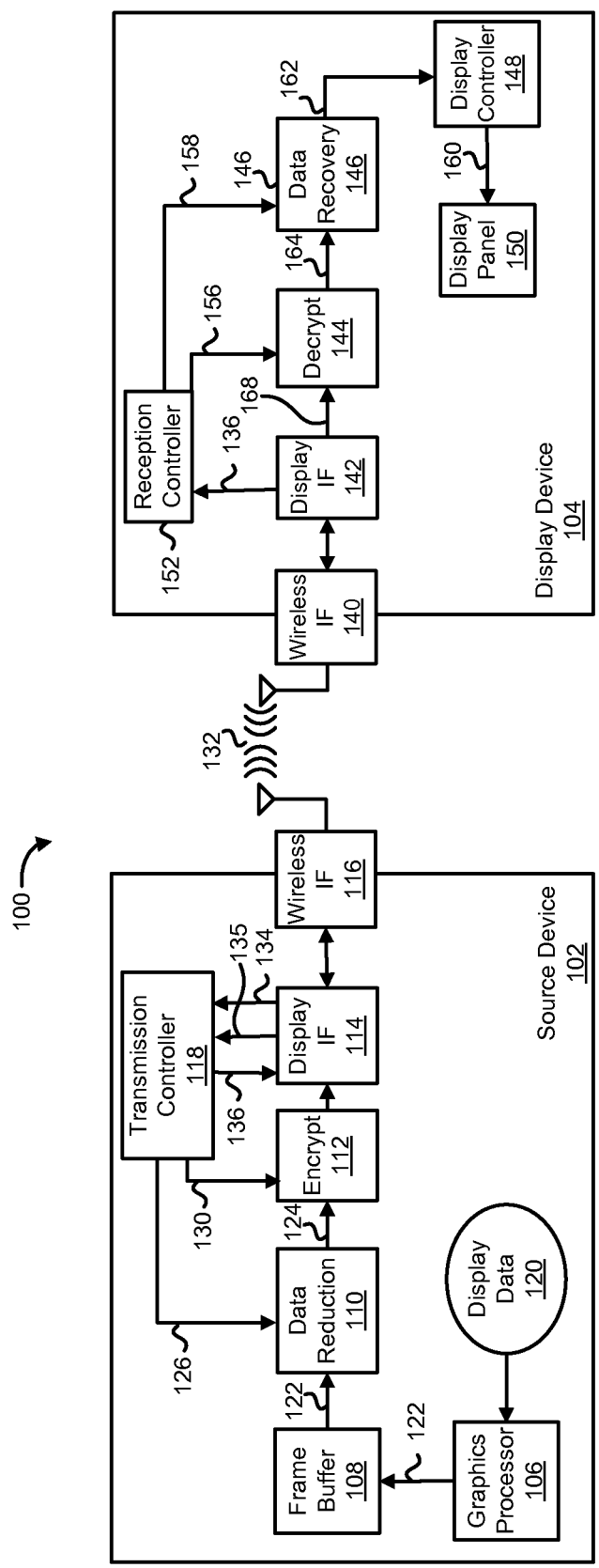
FIG. 1 illustrates a system for wirelessly transmitting rendered pixel data between a source device and a display device in accordance with at least one embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a personal digital assistant (PDA), a consumer electronic device, a cellular phone, or any other suitable device, and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a display. The information handling system can also include one or more buses operable to transmit communications between the various hardware components.

FIGS. 1-4 illustrate example techniques for adaptive data rate reduction of rendered pixel data wirelessly transmitted between a source device and a display device. In at least one embodiment, the source device determines the display properties of the display device, such as the native resolution and the frame refresh rate of the display device, and the current available bandwidth of the wireless channel connecting the source device to the display device. The source device adjusts a data rate reduction process that is applied to the rendered pixel data before the resulting pixel data is wirelessly transmitted based on these parameters. The data rate reduction process can include one or both of a compression process or a rate adaptation process, as well as other processes used to adapt the bandwidth of the pixel data to the properties of the wireless link. In the event that the available bandwidth is at least equal to the bandwidth necessary to transmit the rendered pixel data in an unreduced form, the source device can bypass the data rate reduction process. Otherwise, when the available bandwidth is insufficient for transmission of the rendered pixel data in unreduced form, the source device can adjust the data rate reduction process applied to the rendered pixel data before transmission so as to comply with the current available bandwidth. This adjustment can include a change in the type of compression/rate adaptation applied, a change in the effective compression ratio, as well as adjustments to other processes used to adapt the bandwidth of the display data. In response to a change in the data rate reduction process, the source device further can transmit to the display device a protocol identifier (ID) that identifies the relevant parameters of the current data rate reduction process being applied by the source device. The display device can use this protocol identifier to configure its processing of the rendered pixel data before the resulting pixel data is displayed so as to mirror or otherwise comply with the particular data rate reduction process applied by the source device. As this adaptive data rate reduction technique occurs subsequent to the rendering of encoded display data into corresponding rendered pixel data and further may be subsequent to any formatting of the rendered pixel data into a particular transmission standard (such as a format compatible with the DisplayPort standard), the adaptive data rate reduction technique may be transparent to the display decoding and formatting components and thus may be implemented in conventional display systems initially configured for wire-based transmission of rendered pixel data between the source device and the display device, such as in conventional systems configured to communicate via a cable compatible with a DisplayPort standard, a Digital Video Interface (DVI) standard, a High Definition Multimedia Interface (HDMI) standard, a Universal Serial Bus (USB) standard, and the like.

FIG. 1 illustrates a system 100 for processing encoded display data for display in accordance with at least one embodiment of the present disclosure. The system 100 includes a source device 102 and a display device 104. The source device 102 can include, for example, a personal computer (such as a desktop computer or notebook computer), a digital video recorder (DVR), a set-top box, a digital versatile disc (DVD) player, a video-enabled cellular phone, or a PDA. The display device 104 can include, for example, a computer display panel, a television monitor, a portable device display panel, or a wireless projector.

The video source device 102 includes a graphics processor 106, a frame buffer 108, a data reduction module 110, an encryption module 112, a display interface (IF) 114, a wireless IF 116, and a transmission controller 118. The graphics processor 106 is operable to access encoded display data 120 from a data store, such as a hard drive, removable storage medium, or a network source. The encoded display data 120 can include, for example, video data encoded in accordance with at least one of a Motion Pictures Experts Group (MPEG) standard, a QuickTime standard, a Macromedia Flash standard, an H.263 or H.264 standard, and the like. The graphics processor 106 processes the encoded display data 120 to generate rendered pixel data 122 and stores the rendered pixel data in the frame buffer 108.

The data reduction module 110 is configured to access rendered pixel data 122 from the frame buffer 108 as a stream of rendered pixel data, and to apply a data rate reduction process to the rendered pixel data so as to generate reduced pixel data 124 (as a corresponding stream of data). In one embodiment, the particular parameters of the data rate reduction process are configured based on reduction control data 126 received from the transmission controller 118. To illustrate, in the event that the data rate reduction process incorporates a compression process, one or both of the degree of compression (that is, the compression ratio) or the compression type of the compression process can be configured by the reduction control data 126. Further, depending on the reduction control data 126, the data rate reduction process applied by the data reduction module 110 can be configured such that the rendered pixel data 122 is not compressed or rate adapted. That is, the reduction control data 126 can configure the data reduction module 110 so as to bypass application of a data rate reduction process to the rendered pixel data 122. For ease of discussion, reference to the reduced pixel data 124 includes reference to pixel data both in instances whereby the data rate reduction process is applied to the rendered pixel data in instances whereby the data rate reduction process is bypassed based on the reduction control data 126 as described in greater detail herein.

The data rate reduction process applied by the data reduction module 110 can include any of a variety of techniques for reducing the amount of data representing the pixel information, including run length encoding, discrete cosine transform encoding, entropy encoding, fractal encoding, and the like. The implemented type of data rate reduction process can be adjusted so as to implement any of a variety of effective compression ratios as needed to meet the bandwidth constraints imposed by the wireless channel. To illustrate, in one embodiment, the rendered pixel data 122 may be pre-formatted into a stream of data packets (also known as "micropackets") in compliance with the DisplayPort standard. In this case, the data reduction module 110 can apply a compression process or rate adaptation process to each micropacket separately such that the rendered pixel data 122 is reduced on a packet-by-packet basis. The compression process can include, for example, a change in the color quantization (that is, the number of bits used to represent each pixel or each color of each pixel). To illustrate, the rendered pixel data 122 may have an original bit resolution of 30 bits-per-pixel (bpp), and the compression process applied by the data reduction module 110 may result in a reduction in the bit resolution to 24 bpp for the resulting reduced pixel data 124. As such, the compression ratio would be 30:24 or 20% for this example. Similarly, the data rate reduction process can incorporate a rate adaptation process so as to reduce the display data transmission rate through, for example, run length encoding of groups of similar pixel data or frame rate reduction.

The encryption module 112 is configured to selectively apply an encryption process to the reduced pixel data 124 so as to generate encrypted pixel data 128. In one embodiment, the application of the encryption process is controlled based on encryption control data 130 received from the transmission controller 118. For ease of discussion, reference to the encrypted pixel data 128 includes reference to pixel data encrypted by the encryption module 112 in instances whereby the encryption process is applied to the reduced pixel data 124, as well as reference to the reduced pixel data in instances whereby the encryption process is bypassed based on the encryption control data 130 as described in greater detail herein. The encryption process employed by the encryption module 112 can include, for example, the encryption process employed in accordance with a High-bandwidth Digital Copy Protection (HDCP) standard or a similar content protection methods. Further, although FIG. 1 illustrates an implementation whereby the data rate reduction process is applied prior to the encryption process, in other implementations the encryption process may be applied first.

The display interface 114, in one embodiment, is compatible with at least one of a variety of display signaling standards, such as the DisplayPort standard, the HDMI standard, the DVI standard, and the like. The display interface 114 is configured to receive the encrypted pixel data 128 and format a data stream (not shown) for wireless transmission via the wireless interface 116. The data stream includes the encrypted pixel data 128 as well as other control information, such as timing information (e.g., frame timing information) and authentication information. Further, as described in greater detail below, the data stream can include protocol IDs 136 in, for example, the form of DisplayPort Configuration Data (DPCD) messages for DisplayPort-based implementations or the form of a Display Data Channel (DDC) message for HDMI-based or DVI-based implementations.

The wireless interface 116 is configured to establish a wireless channel 132 (that is, a wireless link) between the source device 102 and the display device 104 and then wirelessly transmit the data stream via the wireless channel 132. The wireless interface 116 can include a radio device having a transmission spectrum capable of supporting real-time transmission of rendered pixel data for direct presentation on a display device. To illustrate, in one embodiment, the wireless interface 116 includes a wireless gigabit radio having a transmission spectrum substantially centered at 60 gigahertz (that is, operating in the 60 GHz band). In addition to transmitting the data stream to the display device 104, the wireless interface 116 further can receive upstream information from the display device, such as an Extended Display Information Data (EDID) message 135 or other similar message that identifies the display properties of the display device as described below. Further, in one embodiment, the wireless interface 116 monitors the wireless channel 132 to determine changes in the bandwidth of the wireless channel, as well as changes in other indicators of the status of the wireless channel, such as changes in the packet drop rate, changes in the latency, and the like. After each monitoring/sampling period, the wireless interface 116 provides to the transmission controller 118 a status indicator value 134 that represents the current parameters of the wireless channel 132.

The transmission controller 118 is configured to control the rendering process performed by the graphics processor 106 based on the display properties of the display device 104. To illustrate, assuming an EDID message 135 or other message from the display device 104 indicates that the display device has a display resolution of 1080p (1920×1080 pixels) and a frame rate of 30 Hz, the transmission controller 118 would signal the graphics processor 106 to render the rendered pixel data 122 so as to have the indicated display resolution of 1080p and the indicated frame rate of 30 Hz.

The transmission controller 118 also is configured to control the data rate reduction process applied by the data reduction module 110 and to control the encryption process provided by the encryption module 112 via the reduction control data 126 and the encryption control data 130, respectively. In at least one embodiment, the transmission controller 118 dynamically adapts the data rate reduction process in view of the current available bandwidth of the wireless channel 132 so that that the data stream at least partially resulting from the data rate reduction process can be successfully transmitted to the display device 104 given the current bandwidth constraints of the wireless channel 132. To this end, the transmission controller 118 determines the display properties of the display device 104 from the EDID message 135 received from the display device via the wireless interface 116. From these display properties, which can include the native resolution and the frame rate of the display device 104, the transmission controller 118 determines the raw throughput needed to stream the rendered data 122 in real-time via the wireless channel 132. To illustrate, if the transmission controller 118 identifies the display device 104 as having a display resolution of 1080p (1920×1080 pixels, or 2,073,600 pixels total per frame), a frame rate of 30 Hz, and a pixel resolution of 24 bits per pixel (bpp), the wireless channel 132 will need a bandwidth of approximately 1.5 Gigabits-per-second (Gps) (2,073,600 pixels/frame×30 frames/second×24 bits/pixel) to transmit the rendered pixel data 122 in real-time in an uncompressed format. However, even if the wireless channel 132 is capable of nominally providing this bandwidth, interference and other affects typically will cause the actual available bandwidth of the wireless channel to vary. Accordingly, in one embodiment, the transmission controller 118 determines the current available bandwidth of the wireless channel 132 based on a status indicator value 134 periodically provided by the wireless interface 116. Using the current available bandwidth and the throughput requirements of the rendered pixel data 122 in uncompressed form, the transmission controller 118 controls the data rate reduction process applied by the data reduction module 110 such that the resulting reduced pixel data 124 is capable of successful transmission by the wireless channel 132 under the current bandwidth conditions.

The control of the data rate reduction process provided by the transmission controller 118 can include controlling the degree of compression (that is, the compression ratio) or the degree of rate adaptation. To illustrate using the example above, if the wireless channel 132 had a current available bandwidth of 1.0 Gps, or two-thirds of the bandwidth needed to transmit the uncompressed rendered pixel data 122, the transmission controller 118 could configure the data reduction module 110 to compress or adapt the rendered pixel data 122 by an equivalent compression ratio of 67% (for example, from 24 bpp to 16 bpp) so that the resulting reduced pixel data 124 can be transmitted within the current available bandwidth of 1.0 Gps. Conversely, in the event that the condition of the wireless channel 132 improves such that the wireless channel has a current available bandwidth of 10 Gps, the transmission controller 118 can configure the data reduction module 126 to disable or bypass application of the data rate reduction process such that the rendered pixel data 122 is provided to the encryption module 112 in uncompressed form. Further, the control of the data rate reduction process can include changing the type of compression or type of rate adaptation applied during the data rate reduction process. To illustrate, the data reduction module 110 may select a different compression type based on the percentage change in wireless channel availability. In instances whereby the entire bandwidth of the wireless channel is available for transmission and the resulting bandwidth is adequate for uncompressed transmission of the display data, the data reduction module bypasses application of the data rate reduction process. If the available bandwidth of the wireless channel drops slightly (10%-20% loss for example), then the data reduction module 110 may implement a rate adaptation process such as run length encoding, color quantization, or low ratio I-frame only H.264 encoding to shape the display output transmission. If the available bandwidth of the wireless channel drops significantly (greater than 30% loss for example), the data reduction module 110 may implement full H.264 mode or select an alternate compression method that results in a higher compression ratio.

Turning to the display device 104, as illustrated in FIG. 1 the display device includes a wireless interface 140, a display interface 142, a decryption module 144, a data recovery module 146, a display controller 148, and a display panel 150. The wireless interface 140 is configured to receive the data stream transmitted by the source device 102 via the wireless channel 132. The display interface 142 then processes the received data stream to obtain encrypted pixel data 168 and any protocol IDs 136 included in the data stream. The encrypted pixel data 168 represents the encrypted pixel data 128 included in the data stream at the source device 102. The protocol IDs 136 are provided to a reception controller 152 and the encrypted pixel data 168 is provided to the decryption module 144.

The decryption module 144 is configured to selectively apply a decryption process to the encrypted pixel data 168 based on decryption control data 156 provided by the reception controller 152. In the event that the decryption process is to be applied based on the decryption control data 156, the decryption module 144 applies the decryption process to the encrypted pixel data 168 and outputs the resulting decrypted pixel data 164 (which represents the reduced pixel data 124 generated at the source device 102). In the event that the decryption process is not applied based on the decryption control data 156, the decryption module 144 bypasses the decryption process and passes the encrypted pixel data 168 as the decrypted pixel data 164. Thus, reference to the decrypted pixel data 164 includes reference to decrypted pixel data in instances whereby the decryption process is applied, as well as reference to unencrypted pixel data in instances whereby the decryption process is bypassed.

The data recovery module 146 is configured to selectively apply a data recovery process (such as a decompression process) to the decrypted pixel data 164 based on recovery control data 158 provided by the reception controller 152. In the event that the data recovery process is to be applied based on the recovery control data 158, the data recovery module 146 applies a selected data recovery process to the decrypted pixel data 164 and provides the resulting data as rendered pixel data 162, which represents the rendered pixel data 122 generated at the source device 102. In certain instances, a compression process applied by data reduction module 110 may be a lossy compression type and thus the output of the data recovery module 146 may only be a partial representation of the full amount of data originally in the rendered pixel data 122. In the event that the data recovery process is not to be applied based on the recovery control data 158, the data recovery module 148 bypasses the data recovery process and passes the decrypted pixel data 164 through as the rendered pixel data 162.

The reception controller 152 is configured to control the selective application of the decryption process and the data recovery process based on the protocol IDs 136 received at the display device 104 from the source device 102. In response to receiving a protocol ID 136 in the received data stream, the reception controller 152 determines whether to enable or disable decryption of the received pixel data based on the received protocol ID 136 and whether to enable or disable decompression of the received pixel data based on the protocol ID 136. To illustrate, a received protocol ID 136 could indicate that the associated pixel data was encrypted and compressed based on a compression type "A" with a compression ratio of 30%, and thus the reception controller 152 may format the decryption control data 156 to direct the decryption module 144 to apply the decryption process to the corresponding pixel data and format the decompression control data 158 to direct the data recovery module 146 to apply a decompression process corresponding to the compression type "A" and the compression ratio of 30% to recover the uncompressed pixel data.

The display controller 148 is configured to receive the rendered pixel data 162 and to generate control signaling 160 to direct the display panel 150 to display the imagery represented by the rendered pixel data. The display panel 150 can include, for example, a light-emitting diode (LED) panel, an organic LED (OLED) panel, a cathode-ray tube (CRT) display, and the like, and the control signaling 160 can be formatted accordingly.

Figure 2:
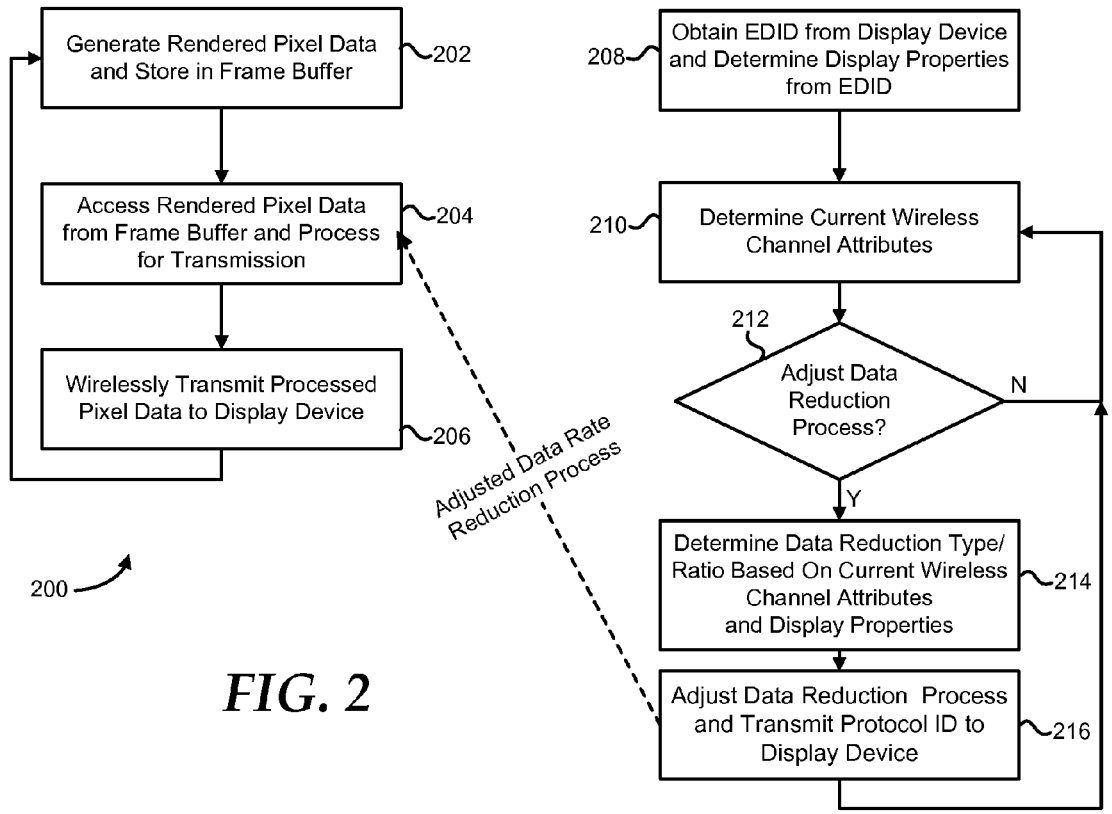
FIG. 2 illustrates an example method of operation of the source device of the system of FIG. 1 in accordance with at least one embodiment of the present disclosure.

FIG. 2 illustrates an example method 200 of operation of the source device 102 of FIG. 1 in accordance with at least one embodiment of the present disclosure. At block 202, the graphics processor 106 accesses the display data 120 and processes the display data 120 to generate the rendered pixel data 122, which is stored in the frame buffer 108 as the rendered pixel data 122 is generated. At block 204, the rendered pixel data 122 is accessed from the frame buffer 108 and processed for transmission via the wireless channel 132 as a stream of data. This processing can include the selective application of a data rate reduction process to the rendered pixel data 122 as directed by the transmission controller 118 based on the current available bandwidth of the wireless channel 118, as well as a selective application of an encryption process to the rendered pixel data 122. At block 206 the processed pixel data is transmitted to the display device 104 via the wireless channel 132. Although blocks 202, 204, and 206 are illustrated as separate, sequential blocks, it will be appreciated that the processes of blocks 202, 204, and 206 are performed concurrently on a streaming basis.

In parallel with the rendering, processing, and transmission of the pixel data, the transmission controller 118 monitors the conditions of the wireless channel 132 so as to adapt the processing of the rendered pixel data to changes in the bandwidth. Accordingly, at block 208 the transmission controller 118 initially receives an EDID message 135 or other message from the display device 104 and from this message determines the display properties of the display device 104, including the native resolution and frame rate of the display device. At block 210, the transmission controller 118 receives a status indicator value 134 from the wireless interface 116 and from this value identifies the current status of the wireless channel 132, including the current available bandwidth of the wireless channel 132.

At block 212, the transmission controller 118 determines whether an adjustment to the data rate reduction process is appropriate in view of the current available bandwidth of the wireless channel. In the event that the current data rate reduction settings result in reduced pixel data that requires a transmission bandwidth suitably matched to the current available bandwidth, no adjustments are needed and thus the flow returns to block 212 to wait for the next status indicator value 134. Otherwise, at block 214 the transmission controller 118 determines the appropriate adjustments in the data rate reduction process that will more suitably match the required transmission bandwidth of the resulting compressed pixel data with the current available bandwidth.

In the event that the current data rate reduction settings result in a reduced pixel data that requires a transmission bandwidth greater than the current available bandwidth, the transmission controller 118 determines one or both of a compression/rate adaptation type or a higher effective compression ratio for the data rate reduction process that will further reduce the transmission requirements of the resulting reduced pixel data to a level sufficient to be successfully transmitted by the wireless channel 132 in view of the current available bandwidth of the wireless channel 132. Conversely, in the event that the current data rate reduction settings result in reduced pixel data that requires a transmission bandwidth less than the current available bandwidth, the transmission controller 118 determines one or both of a compression/rate adaptation type or a lower effective compression ratio for the data rate reduction process that will provide a lower degree of compression in view of the additional bandwidth available in the wireless channel 132.

After determining the appropriate compression settings based on the current available bandwidth, at block 216 the transmission controller 118 updates the reduction control data 126 to direct the data reduction module 110 to implement these data rate reduction settings. The transmission controller 118 also generates a new protocol ID 136 and provides the protocol ID 136 to the wireless interface 116 for transmission to the display device 104 so as to notify the display device 104 of the adjusted data rate reduction settings. The process of blocks 210, 212, 214, and 216 then may be repeated at the next sampling/monitoring period. Table 1 below illustrates an example implementation of the protocol ID 136 generated by the transmission controller 118:

TABLE 1

Example Implementation of Protocol ID

| DPCD Address | Protocol ID Field |
|---|---|
| 00601h (Write) | TRANSMISSION MODE<br>00601h Bit 0 = Display Mode<br>0 = uncompressed<br>1 = compressed<br>00601h Bit 1 = Encryption Mode<br>0 = unencrypted<br>1 = encrypted |
| 00602h (Write) | COMPRESSION TYPE<br>00602h Bits 7: 0 = Compression ID<br>000 = Compression Type A<br>001 = Compression Type B<br>010 = Compression Type C |
| 00603h (Write) | COMPRESSION RATIO<br>00603h Bits 7: 0 = Compression Value |
| 00603h (Read) | WIRELESS CHANNEL<br>00604h Bits 7: 0 = Bandwidth Value<br>00605h Bits 7: 0 = Channel Attribute |

Figure 3:
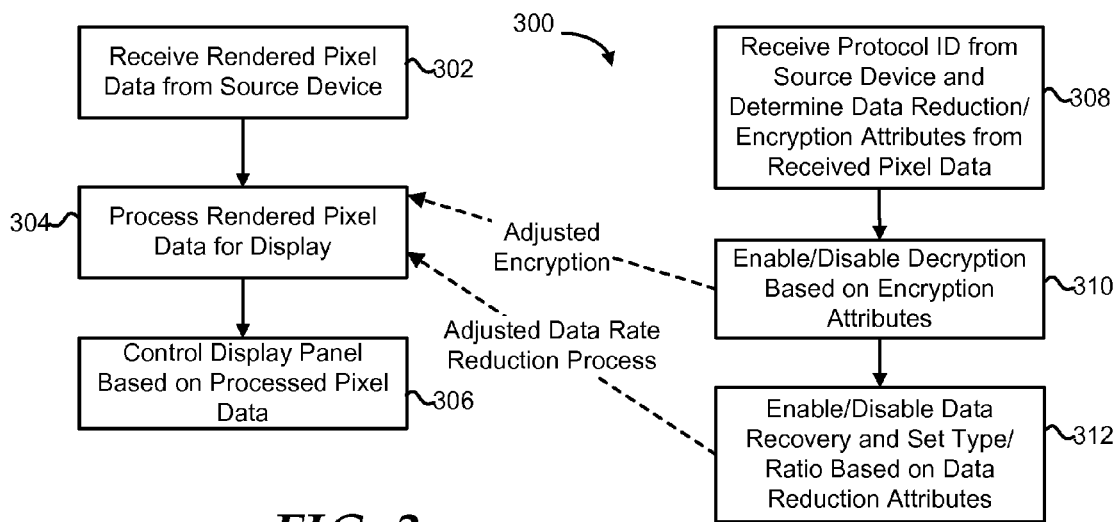
FIG. 3 illustrates an example method of operation of the display device of the system of FIG. 1 in accordance with at least one embodiment of the present disclosure.

FIG. 3 illustrates an example method 300 of operation of the display device 104 of FIG. 1 in accordance with at least one embodiment of the present disclosure. At block 302, the wireless interface 140 receives the data stream from the source device 102 via the wireless channel 132 and the display interface 142 processes the data stream to obtain the rendered pixel data. At block 304, the display device 104 processes the rendered pixel data for display. This processing can include the selective application of a decryption process to the rendered pixel data and a selective application of a data recovery process to the rendered pixel data as directed by the reception controller 152 based on the current data rate reduction/encryption settings of the source device 102 as indicated by the most recent protocol ID 136. At block 306 the processed pixel data is used by the display controller 148 to generate the corresponding imagery at the display panel 150. Although blocks 302, 304, and 306 are illustrated as separate, sequential blocks, it will be appreciated that the processes of these are performed concurrently on a streaming basis.

In parallel with the processing of the pixel data for display, the reception controller 152 monitors the received data stream to update the processing configuration based on newly received protocol IDs 136. In response to receiving a protocol ID 136 from the source device 102 via the wireless channel 132, at block 308 the reception controller 152 determines the compression/rate adaptation and encryption attributes of the processing employed by the source device 102 for the corresponding received pixel data, including whether the received pixel data was encrypted and/or reduced, and if reduced, the type and degree of compression. At block 310, the reception controller 152 formats the decryption control data 156 so as to direct the decryption module 144 to apply a decryption process to the received pixel data in the event that the protocol ID 136 identifies the received pixel data as encrypted or to bypass application of the decryption process in the event that the protocol ID 136 identifies the received pixel data as unencrypted. At block 312, the reception controller 152 formats the decompression control data 158 so as to direct the data recovery module 146 to apply a select data recovery process with a particular degree of decompression and a particular decompression type to the received pixel data in the event that the protocol ID 136 identifies the received pixel data as compressed (and with a corresponding compression type and corresponding compression ratio) or to avoid application of the data recovery process in the event that the protocol ID 136 identifies the received pixel data as uncompressed.

Figure 4:
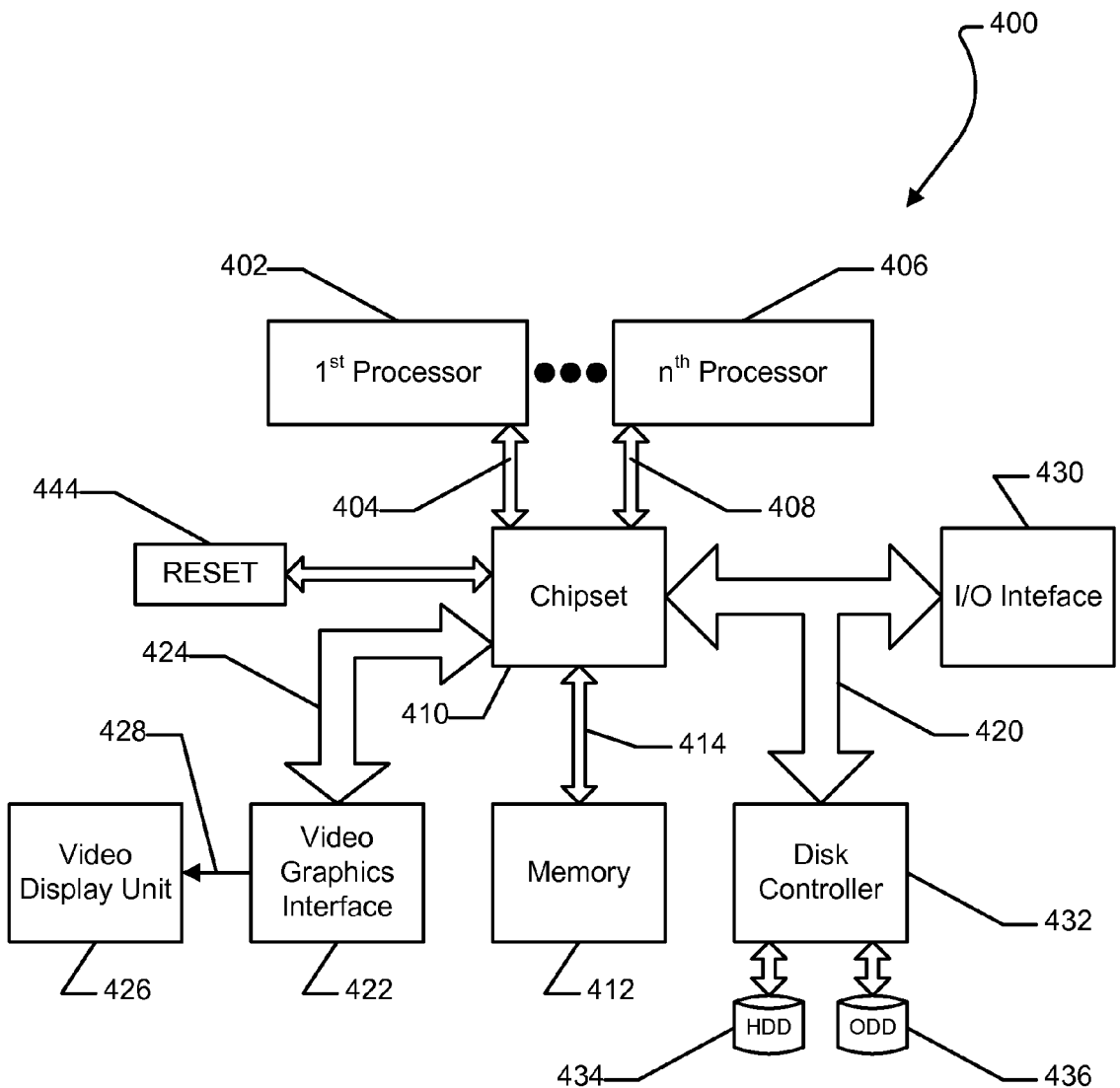
FIG. 4 illustrates an information handling system for implementation in either of the source device or the display device of FIG. 1 in accordance with at least one embodiment of the present disclosure.

FIG. 4 illustrates a block diagram of an example information handling system 400 for implementing either of the source device 102 or the display device 104 in accordance with at least one embodiment of the present disclosure. In one form, the information handling system 400 can be a computer system such as a desktop computer or notebook computer. As shown in FIG. 4, the information handling system 400 can include a first physical processor 402 coupled to a first host bus 404 and can further include additional processors generally designated as $n^{th}$ physical processor 406 coupled to a second host bus 408. The first physical processor 402 can be coupled to a chipset 410 via the first host bus 404. Further, the $n^{th}$ physical processor 406 can be coupled to the chipset 410 via the second host bus 408. The chipset 410 can support multiple processors and can allow for simultaneous processing of multiple processors and support the exchange of information within information handling system 400 during multiple processing operations.

According to one aspect, the chipset 410 can be referred to as a memory hub or a memory controller. For example, the chipset 410 can include an Accelerated Hub Architecture (AHA) that uses a dedicated bus to transfer data between first physical processor 402 and the $n^{th}$ physical processor 406. For example, the chipset 410, including an AHA enabled-chipset, can include a memory controller hub and an input/output (I/O) controller hub. As a memory controller hub, the chipset 410 can function to provide access to first physical processor 402 using first bus 404 and $n^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

The information handling system 400 can also include a display graphics interface 422 that can be coupled to the chipset 410 using a third host bus 424. In one form, the display graphics interface 422 can be an Accelerated Graphics Port (AGP) interface to display content within a video display unit 426. Other graphics interfaces may also be used. The display graphics interface 422 can provide a display output 428 to the display unit 426. The display unit 426 can include one or more types of displays such as a flat panel display (FPD) or other type of display device.

The information handling system 400 can also include an I/O interface 430 that can be connected via an I/O bus 420 to the chipset 410. The I/O interface 430 and I/O bus 420 can include industry standard buses or proprietary buses and respective interfaces or controllers. For example, the I/O bus 420 can also include a Peripheral Component Interconnect (PCI) bus or a high speed PCI-Express bus. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

The information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
wirelessly transmitting rendered pixel data from a source device to a display device via a wireless channel;
monitoring the wireless channel by a wireless interface of the source device;
dynamically adjusting, at the source device, a data rate reduction process that is applied to the rendered pixel data prior to transmission from the source device based on parameters of the wireless channel provided by the wireless interface, wherein:
the parameters are based upon the monitoring; and
the dynamically adjusting the data rate reduction process comprises:
if a bandwidth of the wireless channel is adequate for uncompressed transmission of the rendered pixel data, bypassing application of the data rate reduction process;
if the bandwidth of the wireless channel drops to 10% to 20% below an amount needed for uncompressed transmission, implementing low ratio I-frame only H.264 encoding; and
if the bandwidth of the wireless channel drops to 30% or more below an amount needed for uncompressed transmission, implementing full H.264 mode or another data rate adaptation process that results in a high compression ratio; and
wirelessly transmitting from the source device to the display device a protocol ID to describe adjustments to the rendered pixel data, the protocol ID having a data structure comprising:
a first bit to indicate whether the data reduction process has been applied to produce the rendered pixel data;
a second bit to indicate whether an encryption process has been applied to produce the rendered pixel data;
a first field to indicate a compression type that has been applied to produce the rendered pixel data; and
a second field to indicate a compression ratio that has been applied to produce the rendered pixel data.

2. The method of claim 1, wherein dynamically adjusting the data rate reduction process comprises dynamically adjusting the data rate reduction process further based on at least one display property of the display device.

3. The method of claim 2, further comprising:
receiving, at the source device, an indicator of the at least one display property from the display device via the wireless channel; and
determining the at least one display property from the indicator.

4. The method of claim 3, wherein the indicator comprises an Extended Display Identifier Data (EDID) message.

5. The method of claim 2, wherein the source device comprises a desktop computer.

6. The method of claim 5, wherein the display device comprises a computer display panel.

7. The method of claim 1, further comprising:
wirelessly transmitting an indicator from the source device to the display device via the wireless channel in response to adjusting the data rate reduction process, the indicator identifying a resulting adjustment to the data rate reduction process; and
dynamically adjusting, at the display device, a data recovery process that is applied to the rendered pixel data prior to display of the rendered pixel data at the display device based on the indicator.

8. The method of claim 1, wherein the data rate reduction process comprises a compression process and wherein dynamically adjusting the data rate reduction process comprises increasing a compression ratio of the compression process in response to a decrease in an available bandwidth of the wireless channel and decreasing the compression ratio of the compression process in response to an increase in the available bandwidth.

9. A source device comprising:
a wireless interface to establish a wireless channel with a display device and to monitor the wireless channel;
a graphics processor to generate first rendered pixel data, wherein the first rendered pixel data is formatted into a stream of micro-packets in compliance with DisplayPort standard;
a data reduction module to apply a data reduction process on the first rendered pixel data to generate second rendered pixel data representative of the first rendered pixel data;
a display interface to provide a representation of the second rendered pixel data to the wireless interface for wireless communication to the display device via the wireless channel, the representation comprising a protocol ID having a data structure comprising:
a first bit to indicate whether the data reduction process has been applied to produce the second rendered pixel data;
a second bit to indicate whether an encryption process has been applied to produce the second rendered pixel data;
a first field to indicate a compression type that has been applied to produce the rendered pixel data; and
a second field to indicate a compression ratio that has been applied to produce the rendered pixel data; and
a transmission controller to dynamically adjust a data rate reduction process that is applied by the data reduction module to the first rendered pixel data in generating the second rendered pixel data based on parameters of the wireless channel provided by the wireless interface, the parameters are based upon the monitoring, wherein the dynamically adjusting the data rate reduction process comprises:
if a bandwidth of the wireless channel is adequate for uncompressed transmission of the first rendered pixel data, bypassing application of the data rate reduction process;
if the bandwidth of the wireless channel drops to 10% to 20% below an amount needed for uncompressed transmission, implementing low ratio I-frame only H.264 encoding; and
if the bandwidth of the wireless channel drops to 30% or more below an amount needed for uncompressed transmission, implementing full H.264 mode or another data rate adaptation process that results in a high compression ratio.

10. The source device of claim 9, wherein the transmission controller is to dynamically adjust the data rate reduction process further based on at least one display property of the display device.

11. The source device of claim 10, wherein the transmission controller is to determine the at least one display property based on an indicator of the at least one display property received from the display device via the wireless channel.

12. The source device of claim 11, wherein the indicator comprises an Extended Display Identifier Data (EDID) message.

13. The source device of claim 9, wherein the first rendered pixel data comprises a plurality of data packets and wherein the data reduction module is configured to separately compress or rate adapt each packet.

14. The source device of claim 9, wherein the transmission controller further is to provide an indicator to the wireless interface for communication to the display device in response to an adjustment to the data rate reduction process, the indicator identifying the adjustment to the data rate reduction process.

15. The source device of claim 9, whereby the dynamically adjusting the data reduction process comprises applying the data reduction process to each micro-packet of the stream of micro-packets separately.

16. The source device of claim 9 further comprising a desktop computer.

17. A display device comprising:
a wireless interface to receive first rendered pixel data from a source device via a wireless channel;
a data recovery module to apply a data recovery process and a decryption process to the first rendered pixel data to generate a second rendered pixel data;
a display panel to display one or more frames represented by the second rendered pixel data; and
a reception controller to receive a protocol ID representative of an adjustment made to a data rate reduction process applied by the source device to produce the first rendered pixel data and representative of an encryption process applied by the source device and to adjust the data recovery process and the decryption process, both adjustments based on the protocol ID, wherein the protocol ID has a data structure comprising:
a first bit to indicate whether the data reduction process has been applied to produce the first rendered pixel data;
a second bit to indicate whether the encryption process has been applied to produce the first rendered pixel data;
a first field to indicate a compression type that has been applied to produce the first rendered pixel data; and
a second field to indicate a compression ratio that has been applied to produce the first rendered pixel data,
wherein the adjustment made to the data rate reduction process applied by the source device comprises:
if a bandwidth of the wireless channel is adequate for uncompressed transmission of the first rendered pixel data, bypassing application of the data rate reduction process;
if the bandwidth of the wireless channel drops to 10% to 20% below an amount needed for uncompressed transmission, implementing low ratio I-frame only H.264 encoding; and
if the bandwidth of the wireless channel drops to 30% or more below an amount needed for uncompressed transmission, implementing full H.264 mode or another data rate adaptation process that results in a high compression ratio.

18. The display device of claim 17, wherein the protocol ID comprises a DisplayPort Configuration Data (DPCD) value.

19. The display device of claim 17, wherein:
the rendered pixel data is formatted into a stream of micro-packets in compliance with the DisplayPort standard;
applying the data reduction process comprises applying the data reduction process to each micro-packet of the stream of micro-packets separately; and
receiving the protocol ID representative of the encryption process applied by the source device comprises receiving a protocol ID representative of an encryption process for each micro-packet of the stream of micro-packets separately.

20. The display device of claim 17, wherein the first field is 8 bits and the second field is 8 bits.

* * * * *